United States Patent [19]

Duer

[11] 3,853,022
[45] Dec. 10, 1974

[54] DIFFERENTIAL MECHANISM

[75] Inventor: Morris J. Duer, Lansing, Mich.

[73] Assignee: General Motors Corporation, Detroit, Mich.

[22] Filed: Oct. 24, 1973

[21] Appl. No.: 409,333

[52] U.S. Cl. .................................. 74/713, 74/710
[51] Int. Cl. .............................................. F16h 1/40
[58] Field of Search ........... 74/710, 710.5, 711, 713

[56] References Cited
UNITED STATES PATENTS

| | | | |
|---|---|---|---|
| 3,208,306 | 9/1965 | Lewis | 74/711 |
| 3,400,611 | 9/1968 | Engle | 74/710.5 |
| 3,477,312 | 11/1969 | Duer | 74/711 |
| 3,495,298 | 2/1970 | Engle et al. | 74/711 X |
| 3,527,120 | 9/1970 | Duer et al. | 74/711 |
| 3,580,108 | 5/1971 | Mieras | 74/711 |
| 3,624,717 | 11/1971 | Brubaker | 74/711 |

Primary Examiner—Samuel Scott
Assistant Examiner—Lance W. Chandler
Attorney, Agent, or Firm—Robert M. Sigler

[57] ABSTRACT

A vehicle differential mechanism has a spring provided for retaining the inner ends of the axle shaft within the differential case and limiting axial movement of said axle shafts by biasing them against the pinion shaft. The spring comprises a pair of flat, parallel plate portions with slots for cooperation with the axle shafts, the plate portions being joined by a resilient center portion having a generally omega-shaped configuration which forms an unclosed cylinder around the pinion shaft.

1 Claim, 3 Drawing Figures

DIFFERENTIAL MECHANISM

BACKGROUND OF THE INVENTION

In standard vehicle construction, the driving axles are supported in bearings adjacent the wheels near the outboard ends and have inner ends projecting into the casing of the differential mechanism. In some vehicles, however, a portion of the axle shaft itself is hardened to form the inner race of the bearing. In order to prevent axial movement of the axle shaft, means are provided to retain the inner end of the axle shaft within the differential casing.

The retention of the axle shafts is usually accomplished by the placement of a C washer in a circumferential groove near the inner end of the axle shaft. The C washer, which is retained in a pocket on the inner side of a side gear splined on the inner end of the axle shaft, abuts the inner side of the side gear and thus prevents the axle shaft from being withdrawn. However, accumulated dimensional variations along the axle shaft can result in a looseness which allows some slight axial movement of the axle shaft as the vehicle is subjected to changing axial loads. These movements cause the C washer to be continually bounced against the side gear as the vehicle is operated; and the shocks of this bouncing can be transmitted as noise to the vehicle passenger area, where it could be found objectionable. It is not practical, for reasons of expense, to reduce the allowable dimensional variations of the axle and differential parts to the extent necessary to eliminate the problem.

SUMMARY OF THE INVENTION

My invention comprises a differential mechanism which eliminates the aforementioned problem by positively biasing the inner ends of the axle shafts against the differential pinion shaft by means of a strong spring. The spring comprises a pair of flat parallel plate portions, each of which is provided with a slot for engagement with an axle button on the end of the axle shaft and further comprises a resilient center portion having a generally omega-shaped configuration which forms an incompletely closed generally cylindrical portion to fit around the pinion shaft. The cylindrical portion is provided with an opening to allow the inner ends of the axle shafts to be pulled against the pinion shaft by the parallel plate portions. Further details and advantages of my invention will be apparent from the drawings and following description of the preferred embodiment.

SUMMARY OF THE DRAWINGS

Referring to FIG. 1, a differential mechanism includes a casing 10 with an attached ring gear 12 whereby the casing 10 can be rotatably driven by a vehicle engine through appropriate drive means not shown. The casing 10 defines an interior cavity 14 and a pair of diametrically opposed openings 16. A pinion shaft 18, fixed by a pin 20, traverses the interior cavity 14 of the casing 10 with one end thereof in each opening 16. A pair of pinion gears 22 is rotatably carried on the pinion shaft 18, one near each end thereof in the interior cavity 14.

Figure 1:
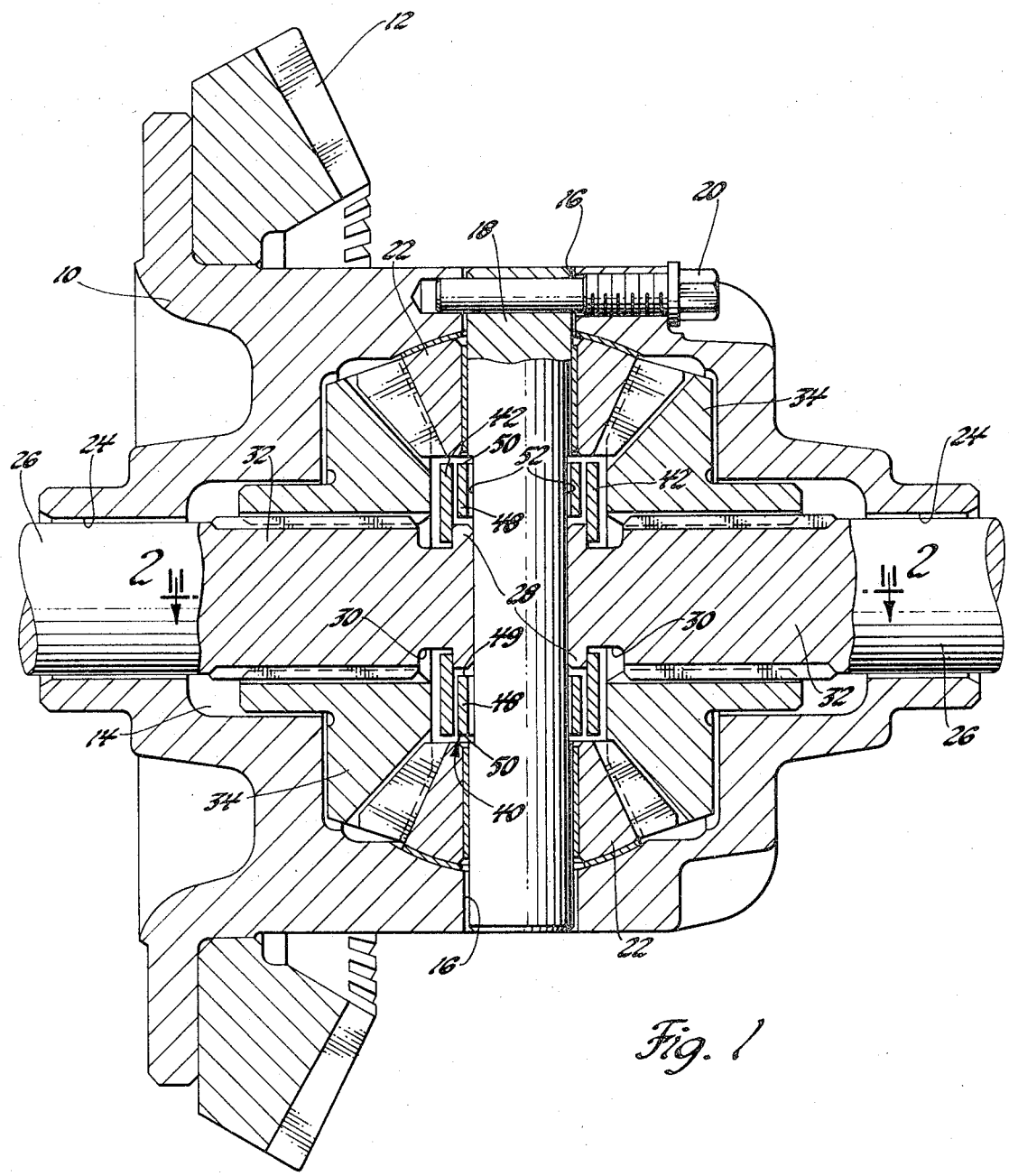
FIG. 1 is a cutaway view of a preferred embodiment of my invention.

The casing 10 includes a further pair of openings 24 for rotatably receiving the inner ends of axle shafts 26. Each axle shaft has formed thereon, starting from the inner end, an axle button 28, a circumferential groove 30 and a splined portion 32. A pair of side gears 34, one of which is splined to the splined portion 32 of each axle shaft 26, mesh with the pinion gears 22 to form a standard differential gear train.

Figure 2:
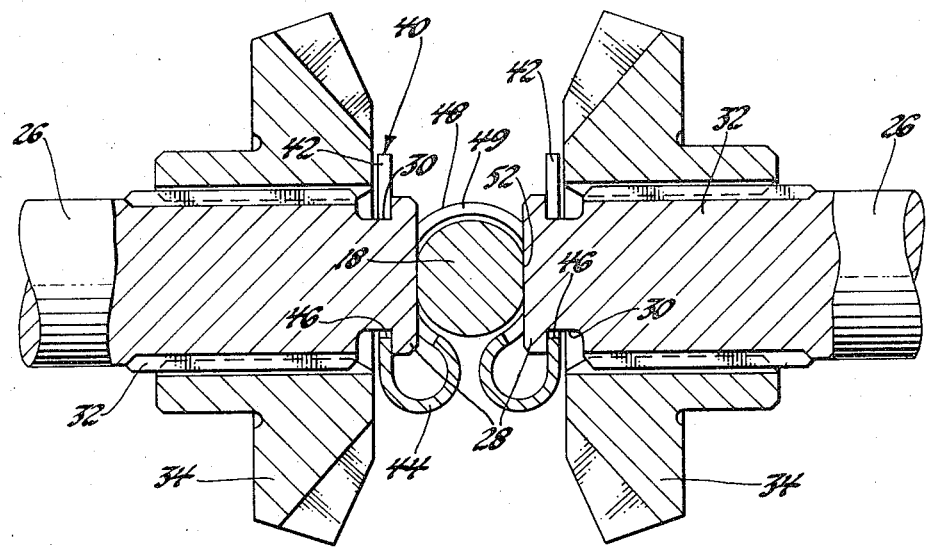
FIG. 2 is a section view along line 2—2 in FIG. 1.
Figure 3:
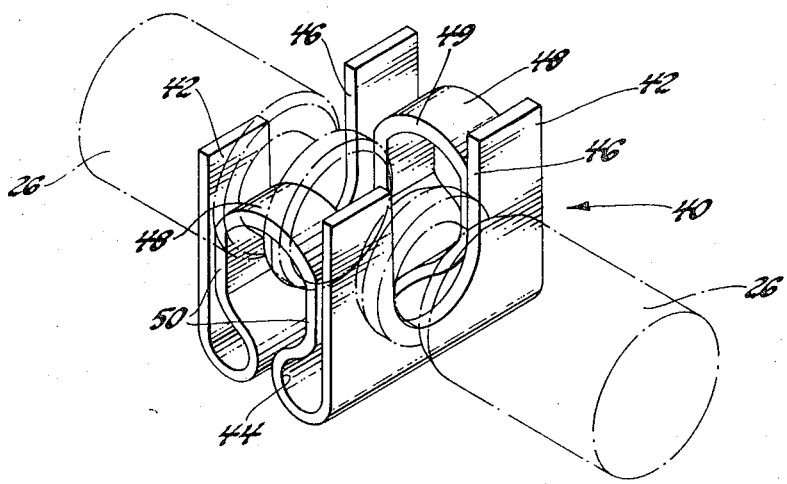
FIG. 3 shows the spring used in the mechanism of FIGS. 1 and 2.

A spring 40, shown in FIG. 3, is formed from a long rectangular strip of metal such as steel. The spring 40 comprises a pair of flat parallel plate portions 42 joined by a resilient central portion 44. As shown in FIG. 2, the central portion 44 has a configuration shaped generally like the upper case letter omega or two S curves back to back and joined at one end. A slot 46 is cut into each flat plate portion from the free end thereof. The central portion 44 forms an incompletely closed cylindrical portion 48 having a pair of diametrically opposed flat sections 50 thereon. The cylindrical portion 48 has an opening 49 cut therein so that both axle shafts 26 can project therethrough.

The spring 40 is placed in the interior cavity 14 so that the cylindrical portion 48 surrounds the pinion shaft 18 with the flat section 50 adjacent corresponding axially extending flats 52 on the pinion shaft 18. The flats 52 are provided on the pinion shaft 18 for contact with the ends of the axle shafts 26. The slots 46 and the spring 40 are wide enough for the insertion of the grooved portion 30 of the axle shafts 26, but are exceeded in width by the axle button 28. The spring 40 is so formed that, when the pinion shaft 18 is inserted in the cylindrical portion 48 and the ends of the axle shafts 26 are inserted in the slots 46, the axle shafts 26 are pulled axially through opening 49 against the flats 52 of the pinion shaft 18.

The fact that the spring 40 pulls the axle shafts inward against the pinion shaft rather than pushing them outward against some other stop is significant. Those shocks that the spring 40 is designed to prevent are caused by forces exerted axially through the axle shafts 26, such as, for example, when the vehicle turns a corner. At such times the greatest portion of the lateral force is exerted by the wheel on the outer radius of the curve. In other words, the force pushing the outer axle against the pinion shaft is greater than the force pulling the inner axle shaft away from the pinion shaft. Thus the spring designed to pull both axle shafts against the pinion shaft never has to oppose the greater lateral force and can thus prevent lateral axle shaft movement a greater percentage of the time than if it were designed to bias the shafts outward.

The preferred embodiment of my invention described herein is not the only embodiment that will occur to those skilled in the art. My invention should include all those embodiments falling within the scope of the following claim.

I claim:

1. In a differential mechanism including a rotatable casing, a pair of output members rotatably received in said casing and adapted to be driven thereby, a gear train comprising intermeshing gears rotatably carried in said casing and interconnecting said output members and said casing, said gear train also comprising a pinion shaft fixedly carried in said housing, the improvement comprising:

an output member retaining device in said casing, said device comprising a pair of parallel flat plates and a resilient center plate joining a corresponding side of each said parallel plate, said resilient center plate being curved in a generally omega-shaped configuration to form an unclosed generally cylindrical portion between said parallel plates, said device being located in said casing with said cylindrical portion surrounding said pinion shaft, said cylindrical portion having at least one opening through the wall thereof whereby said output members may be biased against said pinion shaft, each of said parallel plates having a slot extending inward from the side thereof opposite said resilient center plate, said slots being adapted to engage said output members, said resilient center plate being extended to bias said output members inward against said pinion shaft and thus positively retain said output members within said casing and limit lateral movement of said output members.

* * * * *